(12) United States Patent
Bobich et al.

(10) Patent No.: US 7,958,029 B1
(45) Date of Patent: Jun. 7, 2011

(54) METHOD FOR MINIMIZING FINANCIAL RISK FOR WIRELESS SERVICES

(76) Inventors: Thomas Bobich, Alamo, CA (US); Carl-Manuel Brachet, San Francisco, CA (US); Robert Gray, Danville, CA (US); John Hinman, San Francisco, CA (US)

( * ) Notice: Subject to any disclaimer, the term of this patent is extended or adjusted under 35 U.S.C. 154(b) by 1886 days.

(21) Appl. No.: 10/970,059

(22) Filed: Oct. 20, 2004

Related U.S. Application Data

(60) Provisional application No. 60/513,154, filed on Oct. 20, 2003.

(51) Int. Cl.
  *G06Q 40/00* (2006.01)
(52) U.S. Cl. ......... 705/35; 705/36 T; 705/36 R; 705/37; 705/38; 705/39; 705/40; 705/41; 705/42
(58) Field of Classification Search ............... 705/35–42
  See application file for complete search history.

(56) References Cited

U.S. PATENT DOCUMENTS

| | | | |
|---|---|---|---|
| 5,068,891 A | 11/1991 | Marshall | |
| 5,450,477 A | 9/1995 | Amarant et al. | |
| 5,677,945 A | 10/1997 | Mullins et al. | |
| 5,729,460 A | 3/1998 | Plett et al. | |
| 5,844,972 A | 12/1998 | Jagadish et al. | |
| 5,951,633 A | 9/1999 | Polcyn | |
| 6,009,155 A | 12/1999 | Adachi | |
| 6,195,420 B1 | 2/2001 | Tognazzini | |
| 6,208,720 B1 | 3/2001 | Curtis et al. | |
| 6,226,364 B1 | 5/2001 | O'Neil | |
| 6,404,870 B1 | 6/2002 | Kia et al. | |
| 6,665,387 B2 | 12/2003 | Hannu | |
| 6,785,534 B2 | 8/2004 | Ung | |

*Primary Examiner* — Daniel S Felten
(74) *Attorney, Agent, or Firm* — William S. Morriss; Frost Brown Todd LLC

(57) ABSTRACT

A method and system for managing financial risk through the use of postpaid processing during use of wireless services is presented within the scope of the following invention. The present invention uses credit card authorization to pre-reserve credit card funds for wireless services in excess of planned usage. Authorizations eliminate the credit risk associated with overages and payment timing, and also maintain a customer experience identical to postpaid processing. The authorizations are invisible to the customer and no charge is brought to a customer's credit card until the monthly bill is settled. Separating the authorization and settlement stages of retail wireless payment processing allows the branded wireless provider to avoid inherent areas of credit risk during the tenure of a customer's wireless service, while maintaining a familiar customer experience.

29 Claims, 13 Drawing Sheets

US 7,958,029 B1

METHOD FOR MINIMIZING FINANCIAL RISK FOR WIRELESS SERVICES

CROSS-REFERENCE TO RELATED APPLICATIONS

The present application claims priority under 35 U.S.C. §119(e) to U.S. Provisional patent application entitled "Retail Grab and Go Process" filed on Oct. 20, 2003, having Ser. No. 60/513,154, which is incorporated by reference in its entirety.

BACKGROUND OF THE INVENTION

1. Field of the Invention

The present invention is related to an architecture that enables a wireless service provider, such as a wireless carrier, a Mobile Virtual Network Operator (MVNO), or a Mobile Virtual Network Enabler (MVNE), to manage financial risk within the context of a branded wireless offering.

2. Description of the Background Art

Many companies would like to enter the wireless services market, but there is a high barrier to entry. Technology is needed for customer management, order management, applications management, and billing management. Third-party interfaces are needed in order to outsource certain services, such as customer care and distribution and fulfillment. Subscriber interfaces are needed, such as call centers and web portals.

In response, new players have emerged in the wireless market. They are known as Mobile Virtual Network Operators (MVNOs). MVNOs offer branded wireless services, including the customer management, order management, applications management, and billing management technology mentioned above. However, MVNOs do not have wireless networks. Instead, MVNOs rely on network operators to provide the underlying equipment and communication capabilities, interfacing their systems with network operator systems as necessary. In general, each MVNO offers wireless services under a different brand.

An MVNO-enabler (MVNE) system acts as an intermediary between a brand system and a wireless network by acting as an interface between the brand system and the wireless network. Together, the MVNE system, brand system, and wireless network provide a branded wireless offering. The MVNE system controls customer management, order management, applications management, and billing management. Within the structure of a postpaid wireless offering, there are significant challenges with regards to retail processing of a branded wireless product. Ideally, the product must be suited for "grab and go" purchase where no sales assistance or consultation is necessary at the time of purchase. Also, the product must offer easy to understand communications for the customer and no special sales activity or "in-store technology" required.

The product must offer the typical, postpaid experience with which customers have become very familiar. Typical postpaid processing offers unlimited usage and monthly billing. The monthly recurring charge (MRC) is billed in advance, while all overages, per use fees, taxes, and miscellaneous other charges are billed in arrears.

A drawback with conventional postpaid processing techniques, however, is the requirement of a credit check for each customer at the purchase stage. The need for a credit check eliminates a large number of potential wireless customers and demands specialized processing at retail. To meet the needs of retailers for a simplified, "grab and go" sale, the product must be enabled for bundle minute offers and it must address several areas of financial concern without the need for a credit check on each customer.

When considering the financial risks that are present when engaging in the retail processing of a branded wireless offering, a financial risk manager must maintain product operation within the constraints and operational model of the retail brand. Key constraints of the retail brand can include retail return rate and inventory processing. Also, a financial risk manager must avoid credit risk for the wireless service provider and must offer a product that is simple enough to sell that it qualifies for typical retail margin structure, rather than specialized wireless industry commissions.

Within the context of a typical postpaid retail processing system, several areas of credit risk are present when considering the offer of branded wireless service. For the purpose of this general discussion of the background art, two specific examples of credit risk exposure for a branded wireless offering will be mentioned. A first exposure to credit risk occurs within the month of service, when a customer's wireless usage exceeds the pay-in-advance amount. A second exposure to credit risk can also occur after the billing cycle, when the branded wireless provider is awaiting customer payment. In a typical postpaid financial risk management system, credit risk is addressed by processing a credit check against each customer at the time of purchase.

When considering the procedures of typical postpaid financial risk management systems, addressing credit risk by simply processing a credit check against each customer poses significant drawbacks. There is a cost (of time and money) associated with running credit check against each new customer. Also, the possibility of fraud or non-payment is still a viable financial threat despite access to a customer's credit history.

What is needed is a cost effective and customer friendly method for managing financial risks within the framework of a branded wireless offering, which in turn enables the sale of a postpaid wireless product without specialized retail processing.

SUMMARY OF THE INVENTION

The present invention overcomes the limitations of the conventional system for processing retail transactions in a branded postpaid wireless environment with a system and methods that use credit card authorization to pre-reserve credit card funds. Authorizations eliminate the credit risk associated with overages and payment timing, and also maintain a customer experience identical to postpaid processing. The authorizations are invisible to the customer and no charge is brought to a customer's credit card until the monthly bill is settled. Separating the authorization and settlement stages of retail wireless payment processing allows the wireless provider to avoid inherent areas of credit risk during the tenure of a customer's wireless service, while maintaining a familiar customer experience.

A system is disclosed for managing financial risk for a branded wireless network, including: a) a retail system; b) a mobile virtual network enabler system; c) a wireless network; and d) a financial risk management system. The system is also equipped with: e) a monitoring system for determining usage levels for a mobile device, the monitoring system coupled to the mobile virtual network enabler to receive usage data; f) a memory module for storing usage data for the mobile device, the memory module coupled to the monitoring system; and g) a financial risk minimizing module for limiting the financial exposure for providing wireless services, the financial risk minimizing module coupled to the monitoring system and the mobile virtual network enabler. In general, the present invention provides a system for limiting financial risk associated with subscribers of wireless services, wherein, the wireless services are provided by a mobile virtual network enabler (MVNE), a Mobile Virtual Network Operator (MVNO), a wireless carrier, or any particular wireless service provider.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
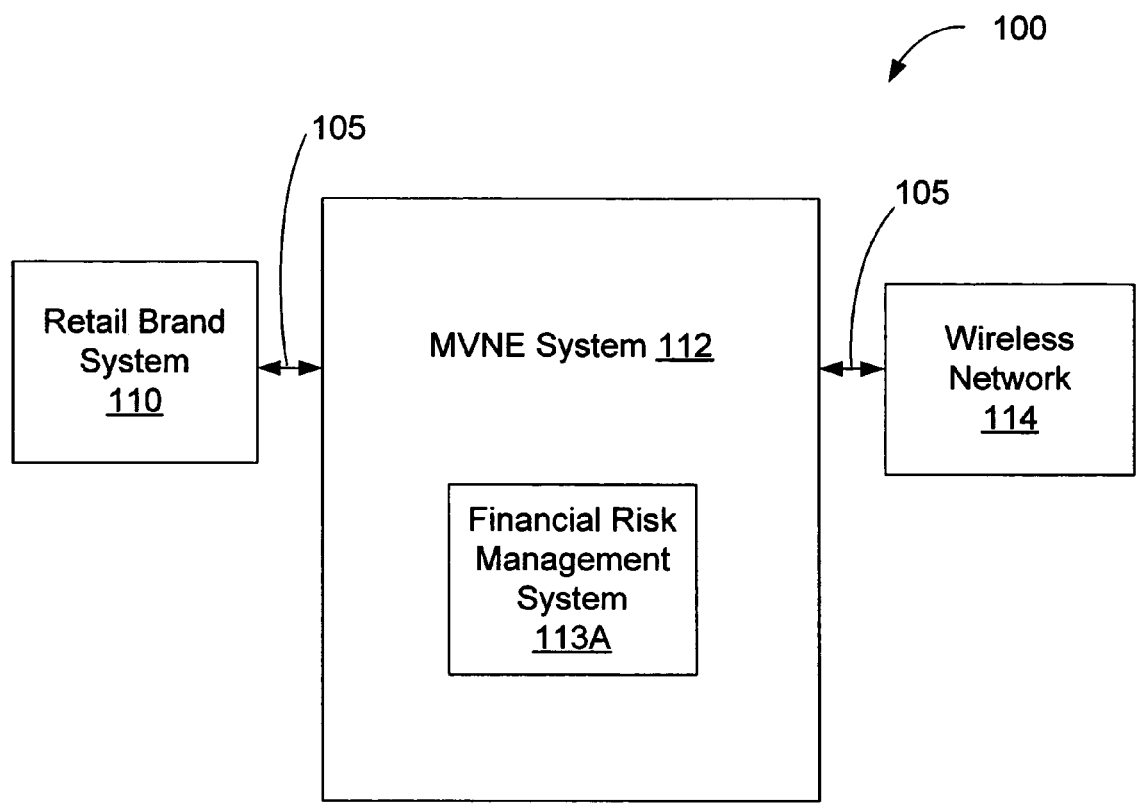
FIG. 1A illustrates a block diagram of a system for managing financial risk for wireless services, according to one embodiment of the present invention.

FIG. 1A illustrates a block diagram of architecture 100 for managing financial risk for wireless services, according to one embodiment of the invention. Within the framework of the present invention, a mobile virtual network enabler (MVNE) 112 communicates to the retail brand system 110 and the wireless network 114 by way of network connection 105, as shown in the architecture 100 for managing financial risk for wireless services. In conventional MVNE wireless service architecture, the MVNE 112 is responsible for initializing accounts, monitoring usage, and processing bills. In other possible embodiments, an MVNO, wireless carrier, or any wireless service provider is responsible for initializing accounts, monitoring usage, and processing bills.

In the illustrated embodiment, wireless network 114 comprises a wireless network, including underlying equipment and communication capabilities. For example, wireless network 114 comprises or interacts with wireless base stations, mobile switching centers, messaging service centers (such as short MSCs and multimedia MSCs), home location registers (HLR), and a wired line carrier. Wireless network 114 enables services such as, for example, provisioning, call detail record (CDR) retrieval, trouble ticketing, coverage, suspension, wireless number portability (WNP), and operational support systems/business support systems (OSS/BSS) integration. When a customer uses a wireless device to make a phone call, the call travels through wireless network 114.

In one embodiment, network connection 105 is a public network, such as the Internet. In another embodiment, network connection 105 is a private IP-based Local Area Network (LAN) or Wide Area Network (WAN) or dedicated connection.

In the illustrated embodiment, retail brand system 110 is a computer and/or operations system that provides marketing, customer acquisition, and branding of the wireless offering. The retail brand system 110 is similar to a mobile virtual network operator, except that retail brand system 110 does not provide technology for customer management, order management, applications management, and billing management. Instead, these services are provided by MVNE system 112.

Figure 1B:
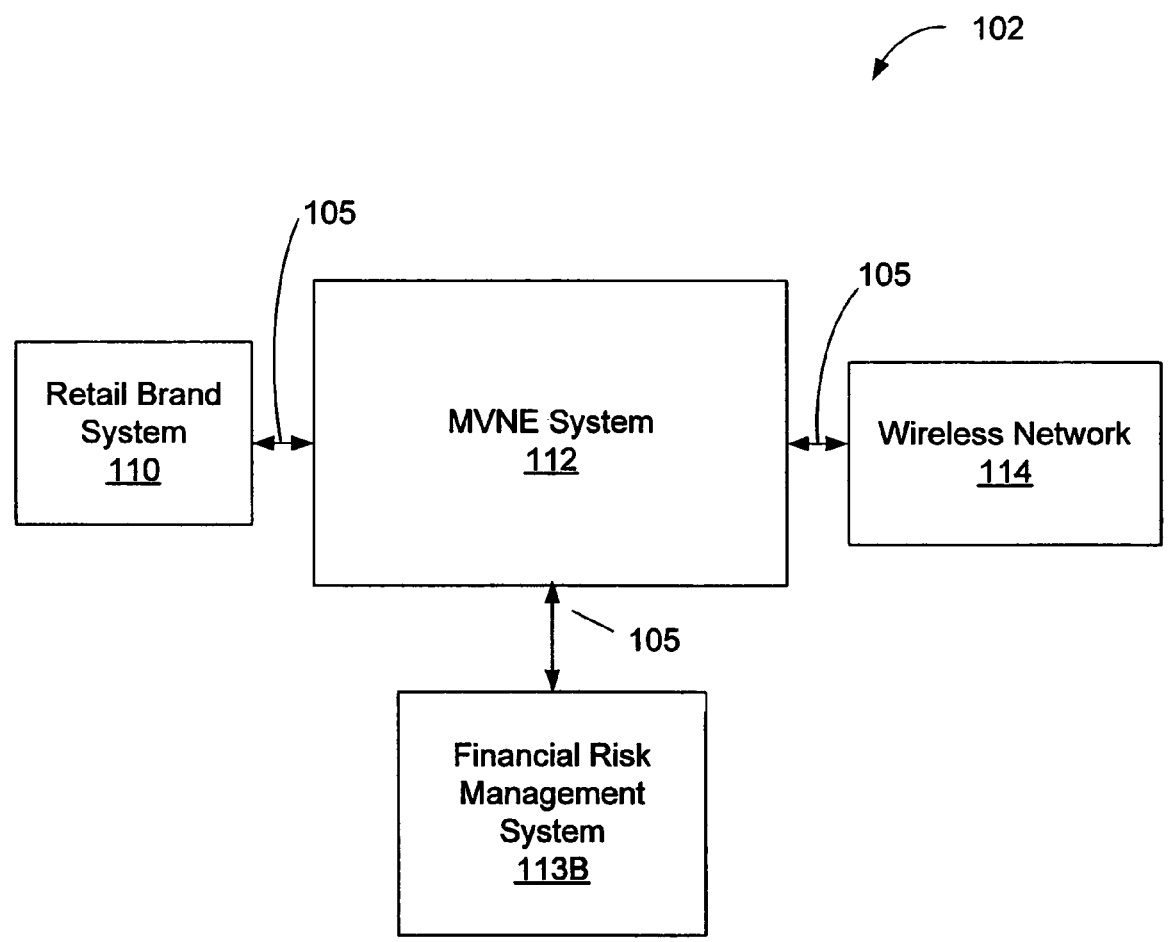
FIG. 1B illustrates a block diagram of a system for managing financial risk for wireless services, according to a second embodiment of the present invention.

In one embodiment of the present invention, the MVNE system 112 includes the financial risk management system 113A. A second embodiment 102 of the architecture for managing financial risk for wireless services, as diagrammed in FIG. 1B, allows the financial risk management system 113B to be outsourced to a third party and coupled to the MVNE system 112 by a support network connection 105. Whichever embodiment is preferable, the MVNE system 112 will have direct access, by way of the financial risk management system 113A/B, to customer account information in order to monitor wireless usage, process bills, and ultimately manage the minimizing of financial risks.

Figure 1C:
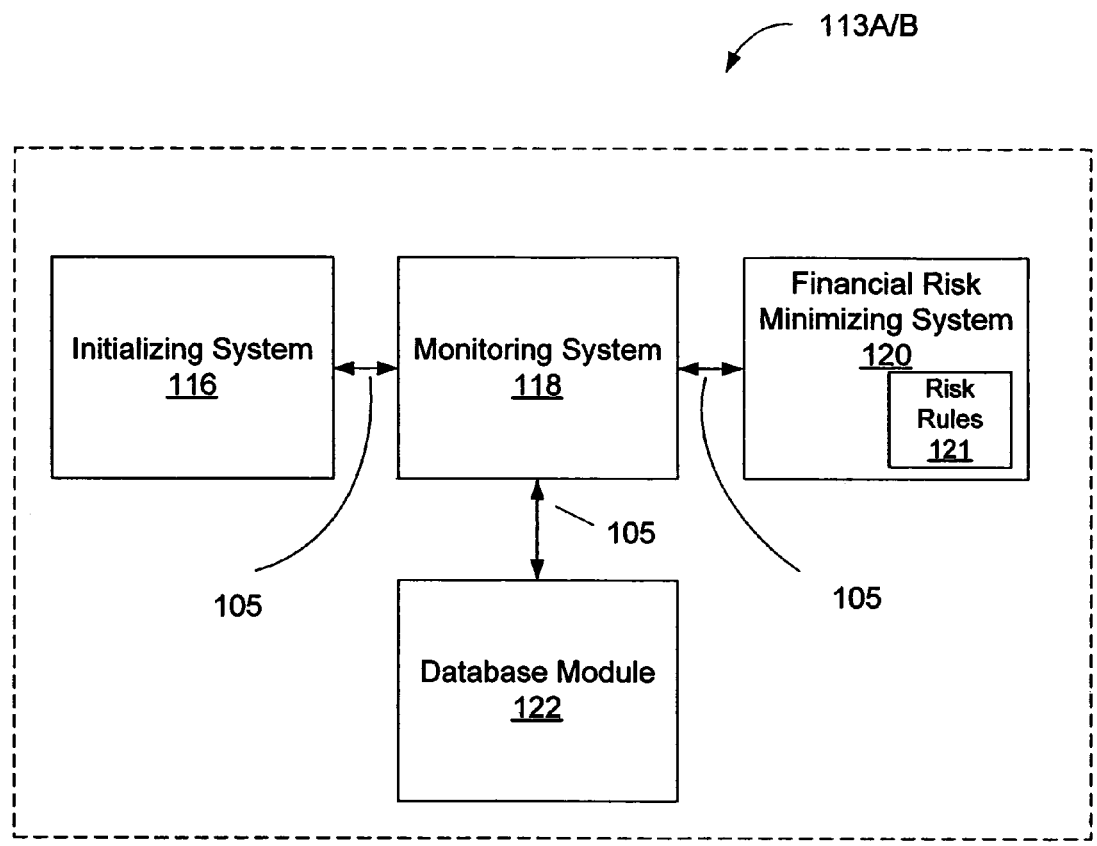
FIG. 1C illustrates a block diagram of a system for a financial risk management system for wireless services, according to one embodiment of the present invention.

Referring to FIG. 1C, a more detailed view of the financial risk management system 113A/B is provided. The financial risk management system 113A/B contains an initializing system 116, monitoring system 118, financial risk minimizing system 120, and a database module 122. If the financial risk management system 113A/B is outsourced to a third party, the MVNE has direct access to all of the managing systems by way of network connection 105. The initializing system 116 collects the customer's credit card information, determines the customer's monthly wireless usage threshold, authorizes the initial month's payment and settles the payment with the customer's credit card company, and initializes wireless service. The monitoring system 118 oversees the usage patterns of a particular customer and reporting this information to the financial risk minimizing system 120. The financial risk minimizing system 120 analyzes the information received from the monitoring system to maintain the amount of financial risk within defined parameters for the branded wireless service. The data generated within the financial risk management system 113A/B is stored within database module 122. The initializing system 116, monitoring system 118, and financial risk minimizing system 120 are all interconnected by way of wireless network connection 105 and the monitoring system 118 is coupled to database module 112 by way of network connection 105 as well. The data signals that are passed between the modules in the financial risk management system 113A/B, according to one embodiment of the present invention, include customer usage, customer profile, and customer subscription information and the like. The structure of system 113A/B is established for efficient transfer of the data signals in order to effectively minimize financial risks.

Figure 2:
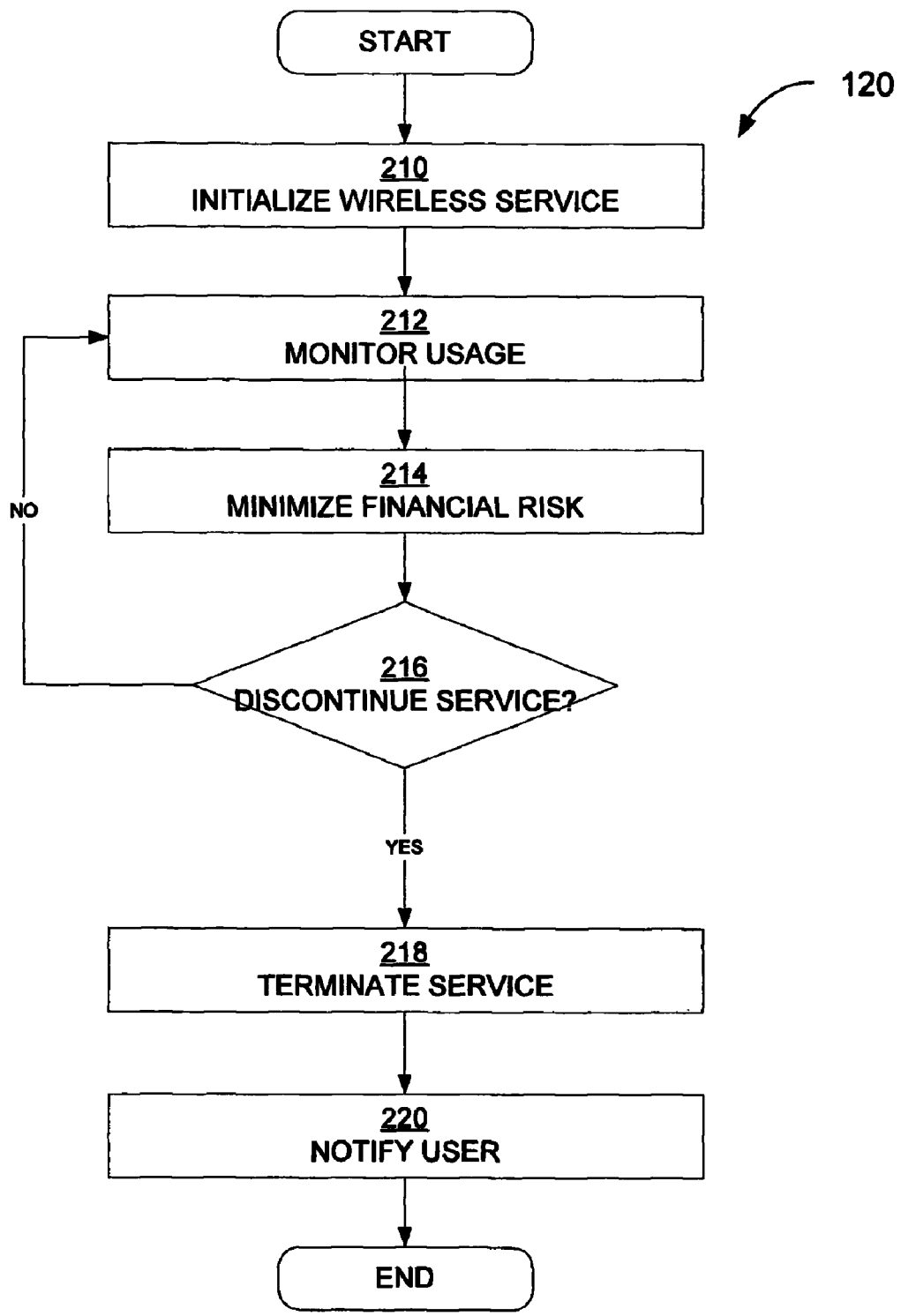
FIG. 2 is a flow diagram that illustrates a method for managing financial risk for wireless services, according to one embodiment of the invention.

FIG. 2 is a flow diagram that illustrates a method for managing financial risk for wireless services, according to one embodiment of the invention. The steps for managing financial risk for wireless services include initializing 210 the wireless service, monitoring 212 usage, and minimizing 214 financial risks. Step 216 allows the financial risk management system 113A/B to continually check, on a monthly, weekly, hourly, sub-hourly, or any chosen period of time, to determine whether wireless service should be suspended or terminated. The financial risk management system 113A/B determines whether to discontinue wireless service. In one embodiment of the present invention, the financial risk management system 113A/B determines that wireless service should be discontinued. The financial risk management system 113A/B reports to the MVNE system 112, and the MVNE system 112 alerts the wireless network for suspension or termination 218 of service. The MVNE system 112 then notifies 220 the customer that wireless service has been suspended or terminated. In a second embodiment of the present invention the financial risk management system 113A/B determines that wireless service should not be interrupted. In this case, the system 113A/B will return to monitoring 212 wireless usage.

Figure 3:
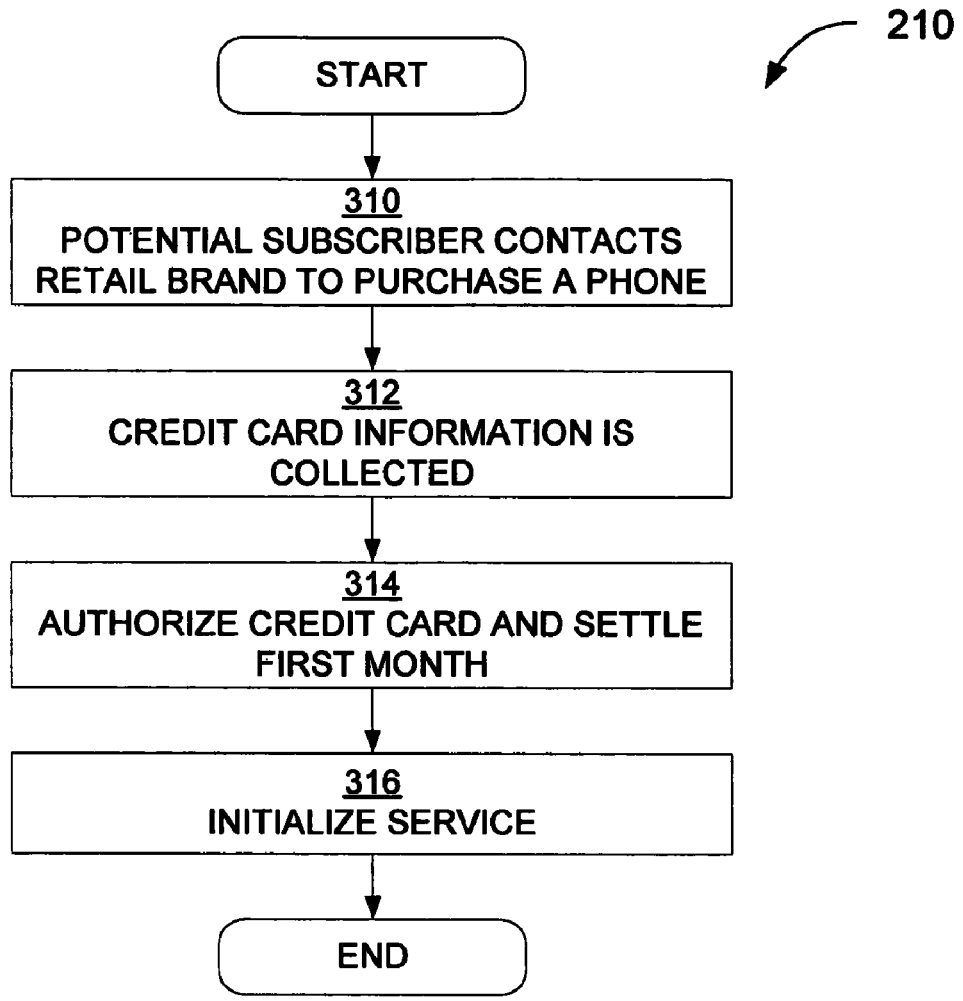
FIG. 3 is a flow diagram that illustrates a method for initialization of wireless services, according to one embodiment of the invention.

FIG. 3 is a flow diagram that illustrates a method for initialization of wireless services, according to one embodiment of the invention. As noted above, this is a key component of providing "Grab and Go" functionality. The steps for initializing 210 wireless services begins with a potential wireless subscriber contacting 310 a retailer for the purpose of purchasing a telephone. After purchase of the appropriate phone, the subscriber will contact the retail wireless brand, or the appropriate MVNE on behalf of the wireless provider, with their intention to initiate wireless services. The subscriber's credit card information is collected 312 by the MVNE system 112 and a transaction is initiated to authorize the customer's credit card and settle 314 payment for the first month of service. At this point, the MVNE system 112 then communicates with the wireless network 114 and the wireless network 114 initializes 316 wireless service. An important consideration for minimizing financial risk pertains to the specific timing of customer credit card authorization, credit card settlement, and initialization of wireless service. Only after the customer's credit card has been authorized and settled for the first month of wireless service will the financial risk management system 113A/B instruct the wireless network 114 to initialize service.

Figure 4:
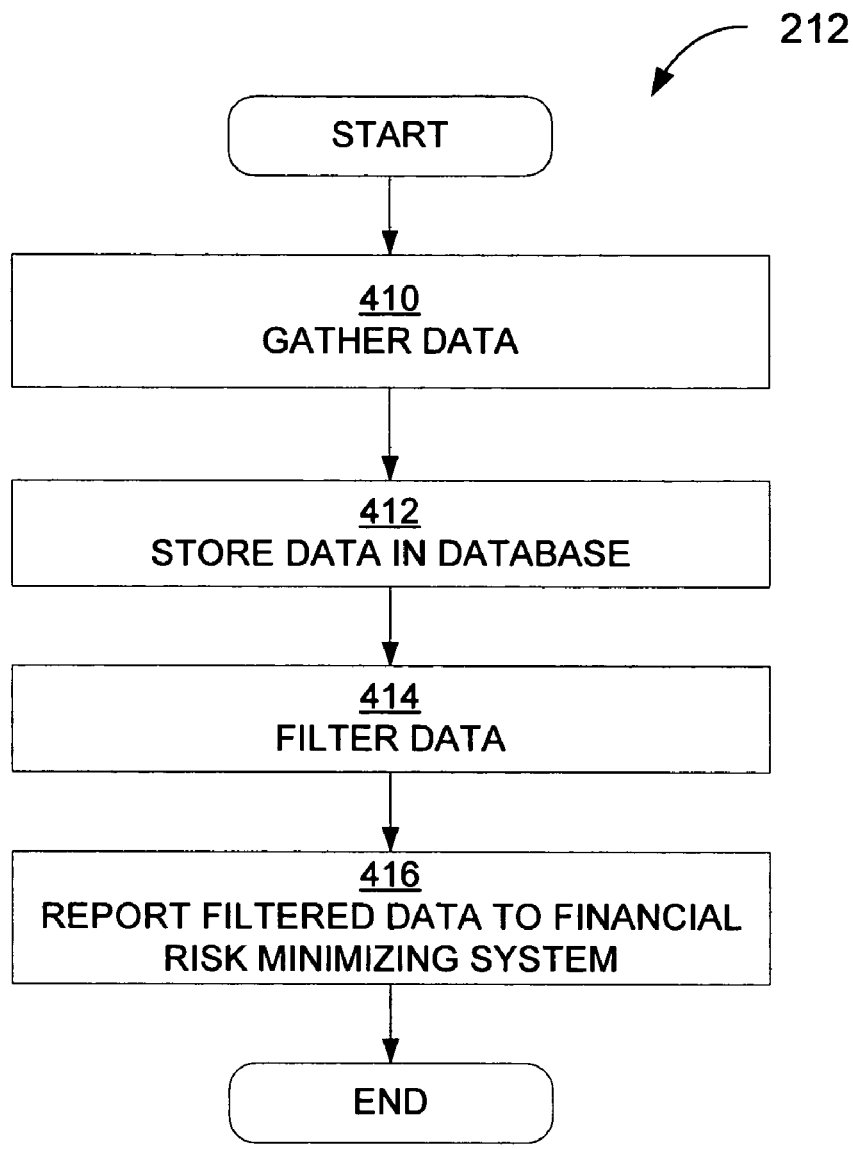
FIG. 4 is a flow diagram that illustrates a method for monitoring wireless service usage, according to one embodiment of the invention.

FIG. 4 is a flow diagram that illustrates a method for monitoring wireless service usage, according to one embodiment of the invention. The steps for monitoring wireless services include gathering 410 data, storing 412 data in a database, filtering 414 data, and reporting 416 filtered data to the financial risk minimizing system. Data for wireless services contains: information about the customer, including credit card information; how often a customer uses a wireless service (usage); and what type of subscription was purchased, including information regarding the amount of wireless service that has been purchased per month (monthly threshold). The type of subscriptions represented by the preferred embodiments of the present invention rely upon the use of "Grab and Go" technology, where, after an initial sign-up fee, wireless services are rendered before payment as in a typical postpaid retail processing routine. These subscription types are distinguished from wireless subscriptions where services are rendered after payment has been made (pre-paid system).

The "Grab and Go" process, where a customer can purchase wireless service by simply visiting their favorite retail location and subsequently activating service using their credit card information, is an extremely time efficient and cost effective way to provide a branded wireless service. The customers are happy with the efficiency and ease of credit card transactions without the need for a time-consuming credit check. The MVNE system 112 is protected from the possibility of credit fraud by the implementation of the financial risk management system 113A/B, where a postpaid processing system is maintained without the exposure to inherent areas of credit risk.

Within the "Grab and Go" process, a monthly threshold for wireless service is established when a customer purchases a certain amount of wireless service, for use each month, during the initialization 210 of wireless service. Any amount of wireless usage that exceeds this threshold, or any other usage threshold established by the financial risk management system 113A/B, is considered an overage. The data generated by initializing system 116, monitoring system 118, and financial risk management system 120, including information on monthly thresholds, current customer usage, and overage, is then stored in the database module 122 for future analysis. The database module 122 also stores usage information, including a telephone number and electronic serial number, or any particular mobile device identification information, for a plurality of mobile devices.

The data can be filtered once, less than once, or more than once throughout the day depending on the preferences of the system administrator. The time when data is filtered can fluctuate from month to month, again at the discretion of the system administrator. In one embodiment, when the data is filtered, a usage report is sent to the financial risk minimizing system 120. The financial risk management system 113A/B is further configured to filter out usage data for mobile devices that are prepaid or on a monthly subscription.

Figure 5:
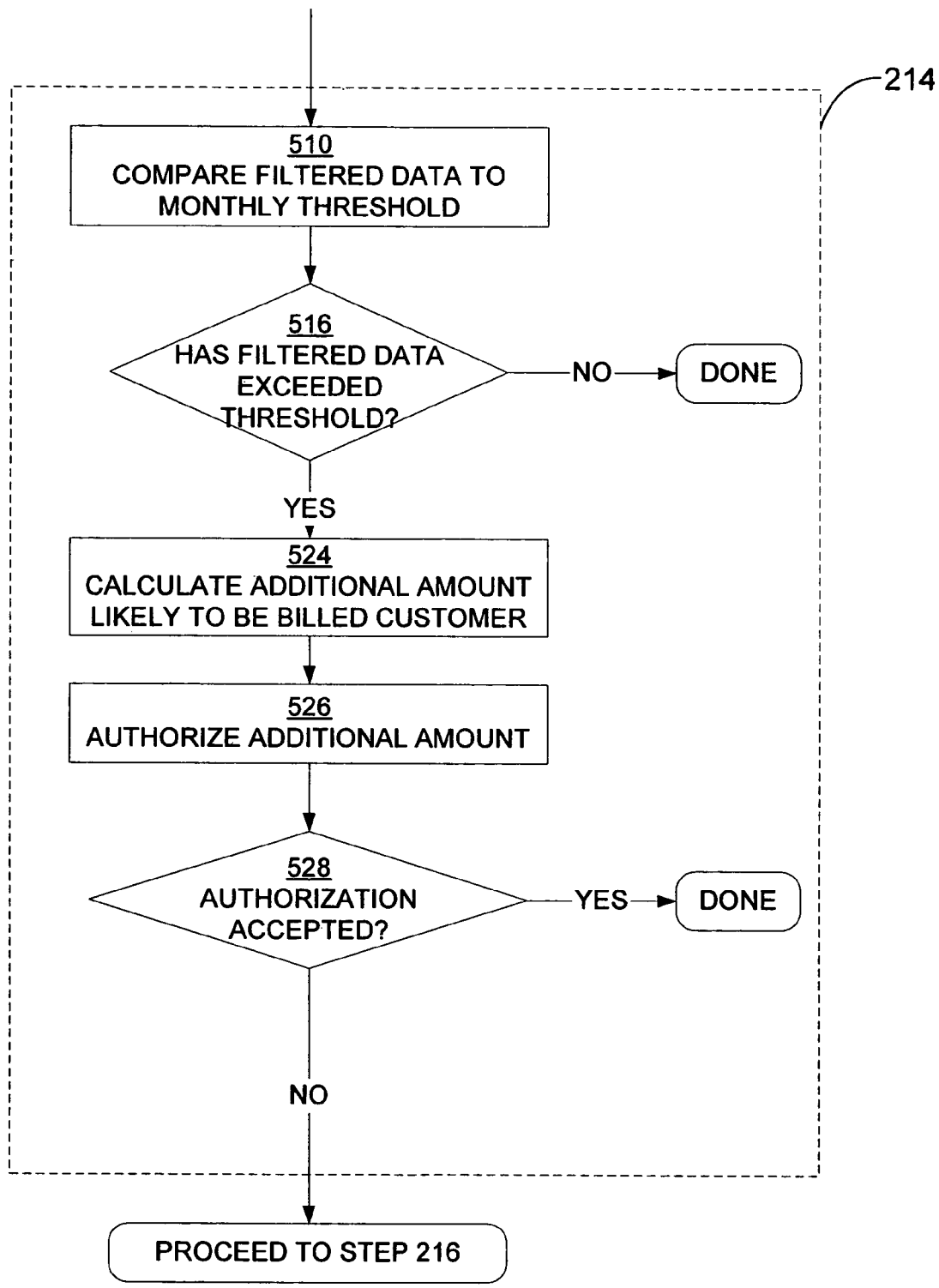
FIG. 5 is a flow diagram that illustrates a method for minimizing financial risk for wireless service, according to one embodiment of the invention.

FIG. 5 is a flow diagram that illustrates a method for minimizing financial risk for wireless service, according to one embodiment of the invention. The first step for minimizing financial risk is to compare 510 the filtered data, that is processed through the monitoring system 118, to the monthly threshold of wireless service that has been established for the subscriber. At this point, the financial risk minimizing system 120 is capable of determining whether an overage has occurred in step 516. If an overage does occur, a risk signal is generated, and calculations 524 are made to the amount that a customer is likely to be billed that reflect the excess of wireless service that has been used and any projections of future use for the balance of the billing cycle. If the filtered data does not exceed the monthly threshold, no action is taken and the system 113A/B continues to monitor customer usage as described in FIG. 2.

In an alternative embodiment, a risk measurement module is coupled to the database to receive usage information. The risk measurement module generating the risk signal if the usage for a mobile device exceeds the predefined threshold. A credit authorizing unit for authorizing a credit card charge in response to the risk signal, where the credit authorizing unit is coupled to the risk measurement module to receive the risk signal and coupled to a credit card company to send an authorization request.

The final step of minimizing financial risk within the structure of a branded wireless offering, according to one embodiment of the present invention, involves authorizing 526 the additional overage amount and then verifying if the customer's credit card accepted the overage authorization 528. If the authorization is accepted, no further action is taken in minimizing financial risk; however, if the authorization is not accepted, the system will then make a determination whether to discontinue wireless service, as shown in FIG. 2.

Figure 6A:
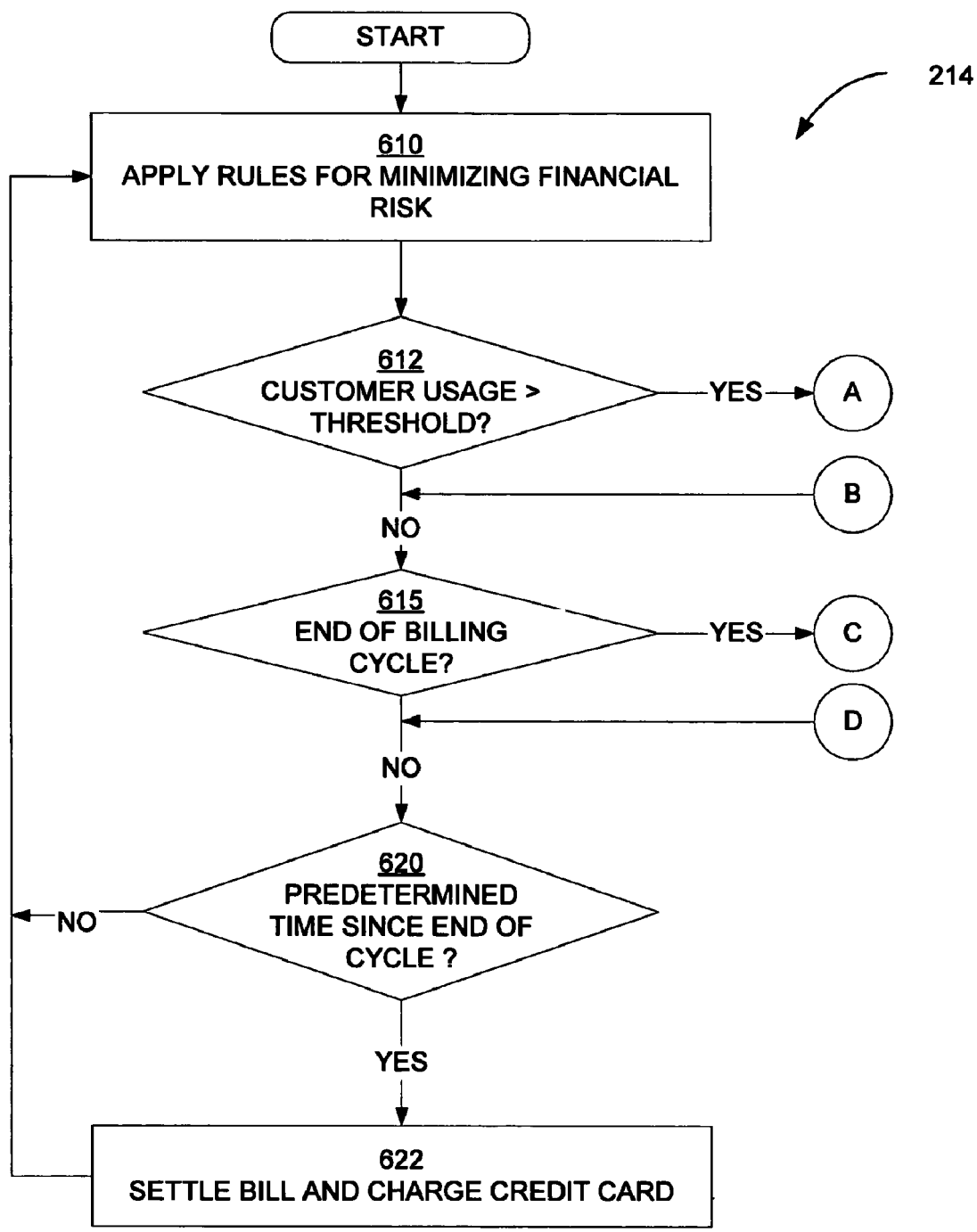
FIGS. 6A-C are flow diagrams that illustrates a method for minimizing financial risk for wireless service, according to a second embodiment of the invention.
Figure 6B:
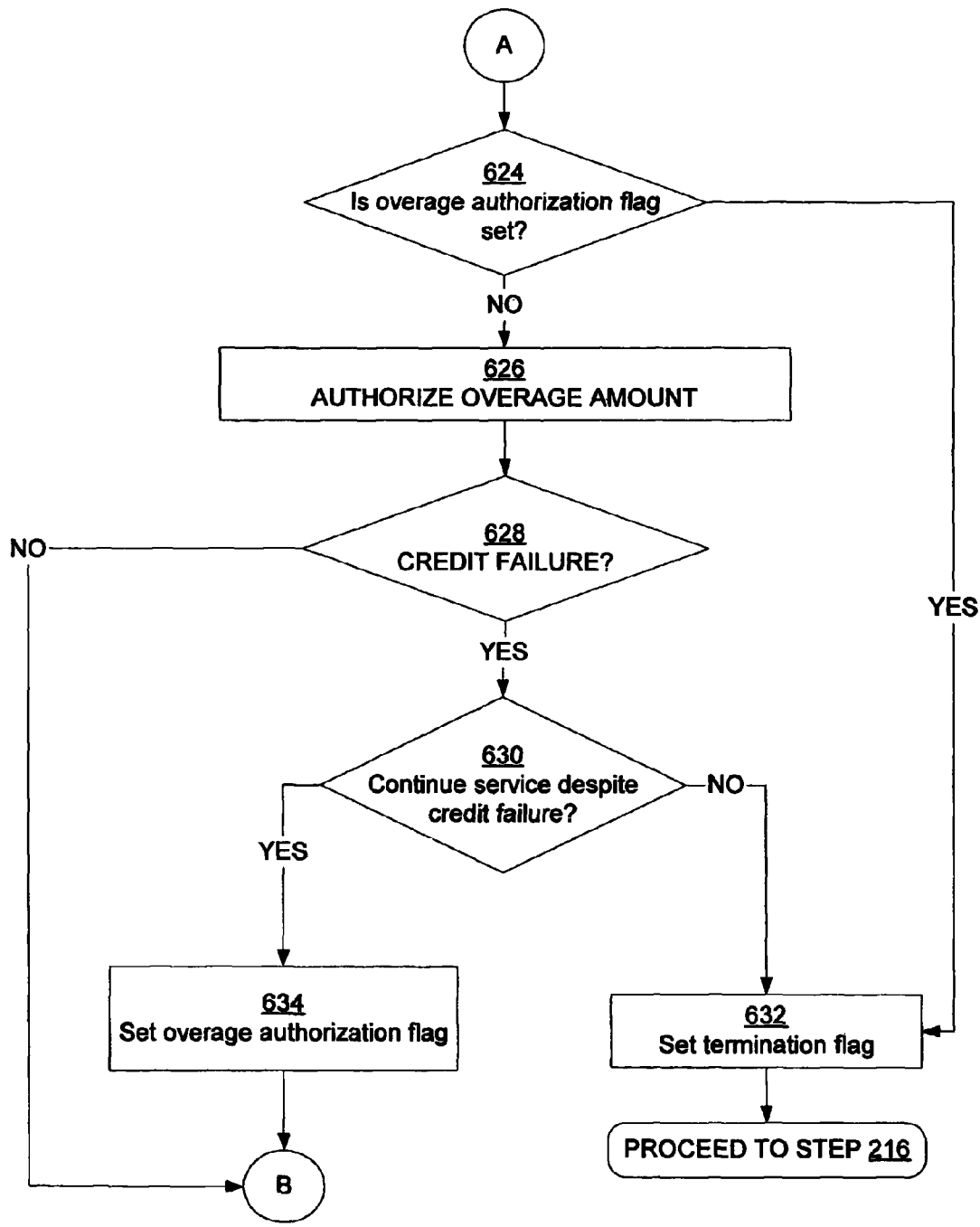
Figure 6C:
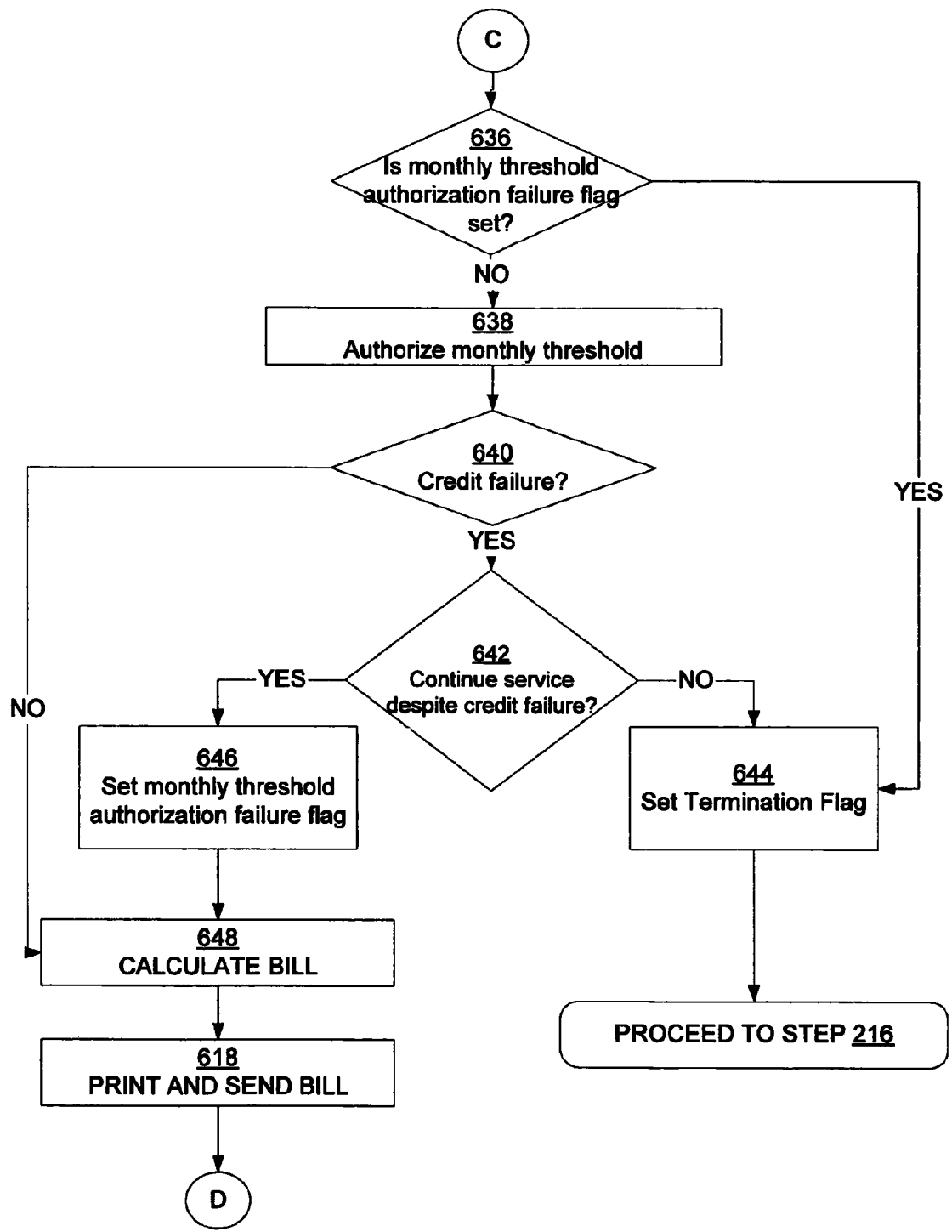

FIGS. 6A-C are flow diagrams that illustrate a method for minimizing financial risk for wireless service, according to a second embodiment of the invention. In step 610, certain predetermined rules are applied for minimizing financial risk. The rules 121 that are applied when considering the reduction of financial risk are based on many parameters. For the sake of a general discussion of possible embodiments of the present invention, customer experience, customer account requirements, and financial considerations are examples of parameters that can be used when determining whether to take action and the amount to bill a customer. A non-exhaustive example set for possible rules 121, include: if less than 3 consecutive months of successful payment, set overage threshold equal to monthly usage plan amount; if customer has 6+ months of successful payments, set overage threshold equal to twice the monthly usage plan amount; if less than 2 days remain in month, do not execute overage processing and authorization; if subscriber's usage rate exceeds 300% of the daily average usage rate for the chosen rate plan after the first 5 days of the billing period, initiate an authorization cycle without regard to actual usage versus threshold; if actual usage exceeds overage threshold by 100% and more than 7 days remain in the billing cycle, initiate authorization and charge processing ahead of the monthly bill processing.

When considering a customer's account requirements, for the application of rules minimizing 610 financial risk can include information regarding the prepayment requirements for premium wireless services. Regarding financial considerations, one embodiment for the application of rules minimizing 610 financial risk can include cost of the authorization processing. A second embodiment pertaining to financial considerations for the application of rules for minimizing 610 financial risk, includes information about payment processing experience. A third embodiment pertaining to financial considerations for the application of rules for minimizing 610 financial risk, includes information about credit experience. A fourth embodiment pertaining to financial considerations for the application of rules for minimizing 610 financial risk, includes information about the credit profile of the hosting wireless service provider. A fifth embodiment pertaining to financial considerations for the application of rules for minimizing 610 financial risk, includes information about the duration of the authorization period offered by the issuing bank.

The amount that is billed a customer can vary from month to month based upon several factors, including the amount of usage, use of service features or applications, toll or long distance charges, or plan changes. In some cases a customer may exceed their allotted monthly amount of wireless service, which is called an overage. An overage can occur in a variety of ways, and are not limited to the following: when customer usage exceeds the monthly usage threshold; or a customer usage rate exceeds a monthly usage rate threshold; or customer usage exceeds the overage threshold; or the customer usage rate exceeds an overage rate threshold. After rules have been applied for minimizing 610 financial risk, the output of step 612 determines whether an overage is significant enough relative to the usage threshold calculated for the account to merit intervention. In one embodiment of the present invention, the affirmative output (A) of step 612 determines that an overage is sufficient and the affirmative output (A) will be checked 624 for an overage authorization flag before processing the overage amount. In a second embodiment of the present invention, the negative output of step 612 determines that an overage does not merit intervention and the process of minimizing 214 financial risk continues.

In the case that the output from step 612 is affirmative (A), the process of minimizing 214 financial risk has the option to authorize 626 a certain overage amount (FIG. 6B) after checking 624 for an overage authorization flag. (When the overage authorization flag is set, step 632 requests that a termination flag is initiated.) The exact amount of the overage threshold to be authorized is determined by the application of rules for minimizing 610 financial risk as discussed previously. The overage threshold is added to the monthly threshold that was established during the initialization process. The customer now has an increased reserve of wireless usage, while the wireless service provider has the assurance that the customer's credit card will be able to cover the cost of additional service. The process of minimizing 214 financial risk is also capable of making more authorizations against a customer's credit card depending on the amount, and frequency, of any subsequent overages above the initial overage threshold.

The process of minimizing 214 financial risk also has the option to check for overage authorization credit failure 628 of the customer's credit card. This allows the financial risk management system 113A/B to determine whether or not to suspend a customer's service if the authorization fails, or to allow the customer a one-time overage grace based upon any rules violations. When a customer's credit fails an overage authorization, the process 214 makes a determination in step 630 whether to continue wireless service despite the customer's failed credit. When the output of step 630 is negative ("no"), a termination flag is set 632 and the output of step 632 is returned to the financial risk minimizing system 120 in order to trigger the termination sequence discussed above. When the output of step 630 is affirmative ("yes"), a one-time overage grace is triggered in step 634 where the overage authorization flag is set, and the overage authorization output (B) is returned to the process of minimizing 214 financial risk. When a customer's credit passes an overage authorization, the output overage authorization output (B) is simply returned to the process of minimizing 214 financial risk.

In the case that output from step 612 (FIG. 6A) is negative ("no"), the process of minimizing 214 financial risk continues and then makes a determination when a billing cycle has ended in step 615. When the current billing cycle is still active, the financial risk management system 113A/B will continue to monitor wireless usage by returning to step 610. Once a billing cycle is over, the process of minimizing 214 financial risk will determine when a certain period of time (preferably within one week) has passed since the end of the billing cycle in step 620. Once the time period of waiting has passed, the process of minimizing 214 financial risk will settle 622 the customer's bill and charge their credit card. While the system 113 A/B is waiting for the certain time period to pass after the end of a cycle, the system 113 A/B will monitor wireless usage by returning to step 610.

In a preferred embodiment of the present invention (FIG. 6C), the process of minimizing 214 financial risk has the option to check for monthly threshold authorization credit failure 640 of the customer's credit card. This allows the financial risk management system 113A/B to determine whether or not to suspend a customer's service if the authorization fails or to allow the customer a one-time overage grace. First, the process of minimizing 214 financial risk determines whether a monthly threshold authorization flag has been set. When the monthly threshold authorization flag has affirmatively been set, the process 214 proceeds to the set termination flag step 632. When the monthly threshold authorization flag has negatively been set, the process 214 proceeds to authorizing 638 the monthly threshold. When a customer's credit fails a monthly threshold authorization, the process 214 makes a determination in step 642 whether to continue wireless service despite the customer's failed credit. When the output of step 642 is negative ("no"), a termination flag is set 644 and the output of step 644 is returned to the financial risk minimizing system 120 in order to trigger the disruption sequence discussed previously. When the output of step 642 is affirmative ("yes"), a one-time monthly threshold grace is triggered in step 646 where a monthly threshold authorization flag is set. At this point, the customer's monthly bill is calculated, printed, and sent (648, 618).

When a customer's credit passes the monthly authorization (or a one-time grace has been allotted), the customer's monthly bill is calculated 648, with any overage charges added, and the bill is printed and sent 618 out to the customer. If a predetermined time for waiting for payment has passed and no payment has been received, then the financial risk management system 113A/B will settle the bill and charge the customer's credit card. During the time that the system 113A/B is waiting for a response to a bill being sent, the system 113A/B is arranged to continually monitor wireless usage and apply any additional overage authorizations that are deemed necessary by the rules for minimizing financial risk.

Figure 7:
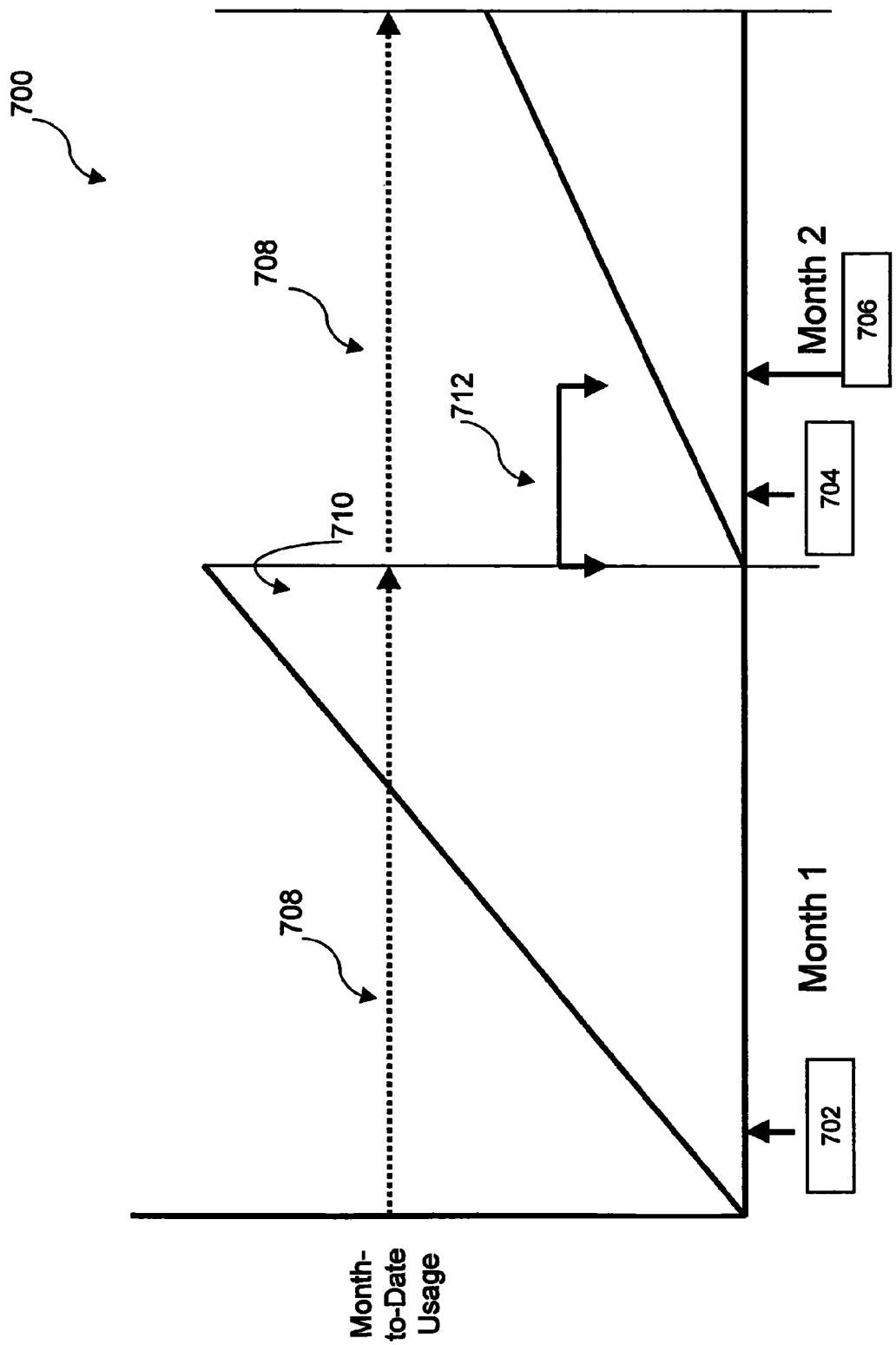
FIG. 7 is a graphical representation of a typical postpaid processing system.

FIG. 7 is a graphical representation of a typical postpaid processing system. Within the structure of a typical postpaid processing system 700, initial payments 702 are collected that cover the first month-to-date and the next month-in-advance of wireless service. At the time of initialization, a monthly threshold 708 of wireless service is established between the customer and wireless service provider. As the customer begins to use their wireless service, two areas of credit risk (710 and 712) are readily apparent: within a payment cycle, when usage exceeds 710 the monthly threshold; and, after the payment cycle, when the service provider is waiting 712 for customer payment. Credit risk 712 exists from the time that a billing cycle ends, and the monthly threshold of wireless service is reset, until payment is received 706. When a bill is sent 704, that includes any overage charges from the previous cycle and the monthly threshold payment for the next cycle, credit risk 712 is not being fully addressed.

Figure 8:
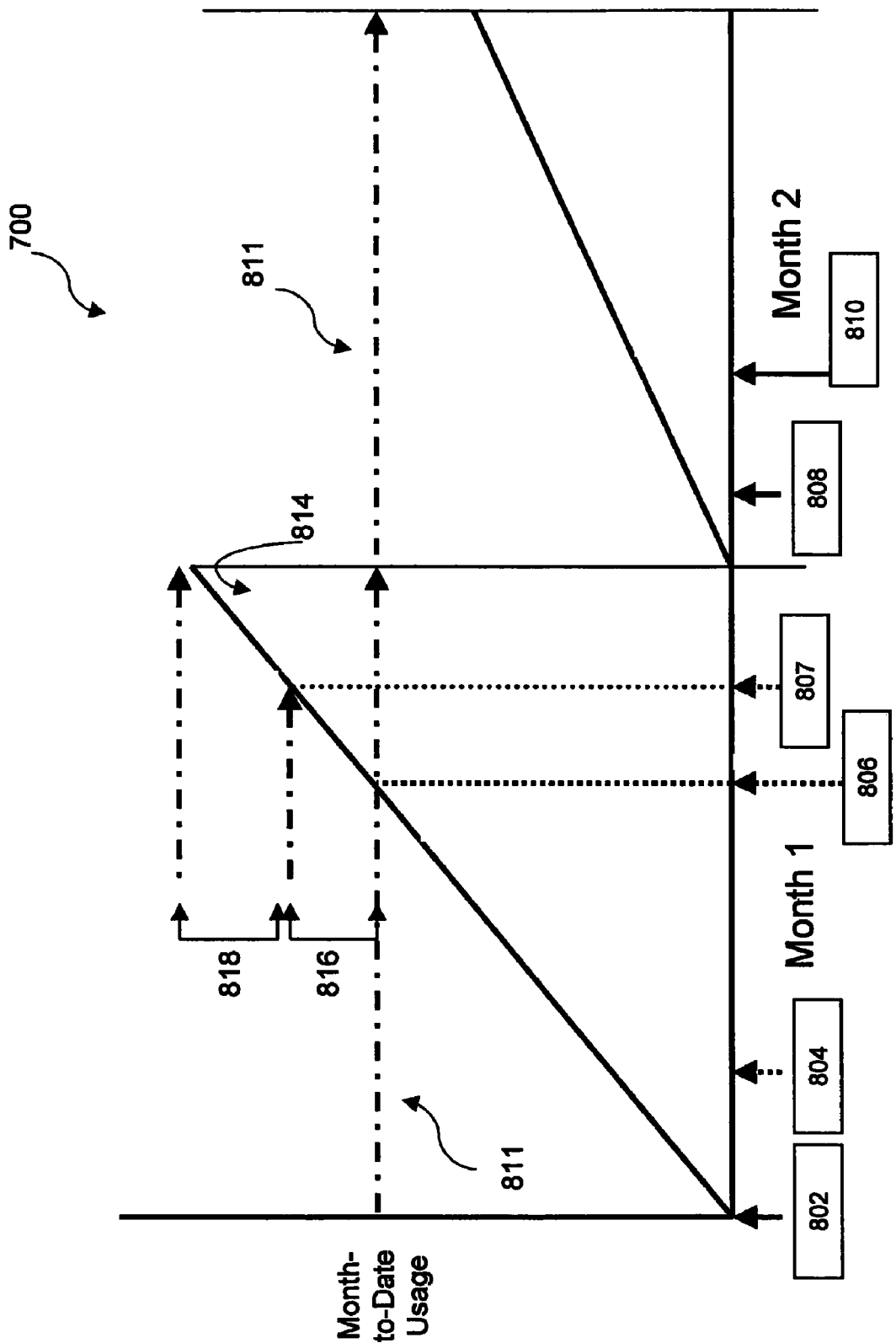
FIG. 8 is a graphical representation of a method for managing financial risk for wireless services, according to one embodiment of the invention.

FIG. 8 is a graphical representation of a method for managing financial risk for wireless services, according to one embodiment of the invention. When considering the scope of one embodiment of the present invention, a method for managing financial risk 800 within the context of a branded wireless offering begins with a customer establishing a monthly threshold 811 of wireless service by making a payment-in-advance 802 at the time activation. After a period of time, before the end of a billing cycle, and preferably within the first week of a new billing cycle, the financial risk management system 113A/B authorizes 804 the monthly threshold of wireless usage for the following month. This authorization reduces or eliminates the credit risk associated with payment timing 712 and is, therefore, beneficial to the strategy of the financial risk management system 113A/B. In the case that a customer exceeds the allotted monthly threshold, an initial overage authorization 806 is processed by the financial risk management system 113A/B and approved overage threshold 816 is determined. The specific amount of the overage threshold 816 is based upon the application 610 of rules for minimizing financial risk established in FIG. 6A. This authorization reduces or eliminates credit risks associated with overages 710.

The financial risk management system 113A/B has capability to initiate additional authorizations against a customer's credit card if customer usage exceeds the approved overage authorization threshold 816 before the end of a payment cycle. The amount of any additional authorizations against a customer's credit card, and allotment of an additional overage threshold 818, are made pending approval and restrictions set by the application 610 of rules for minimizing financial risk. The system 113A/B is capable of making any number of additional authorizations during a payment cycle, as long as a strict code of customer satisfaction is maintained while minimizing the extent of any financial risk. (For example, when the additional overage threshold 818 is exceeded, a new threshold (not shown) is set and another authorization (not shown) is performed. This process can continue as long as approval is received from the application of rules.) The total amount of approved usage above the monthly usage threshold 811 is considered the overage usage 814.

In accordance with one embodiment of the present invention, credit risk 712 has been eliminated through the establishment of monthly authorization 804. The customer's bill (including payment for overage and the next month's threshold usage) is sent 808 and a settlement 810 against the customer's credit card is made without the threat of financial risk 712 that is present within the framework of typical postpaid processing systems. At some point after the settlement 810 of a payment cycle is made, an authorization (not shown) for the next month's monthly threshold is made against the customer's credit card. As discussed, the financial risk management system 113 A/B avoids credit risk for the hosting service provider and is simple enough to qualify for typical retail margin structure, as all credit risk management processing is handled behind the scenes and without significant impact on retail operations.

Figure 9:
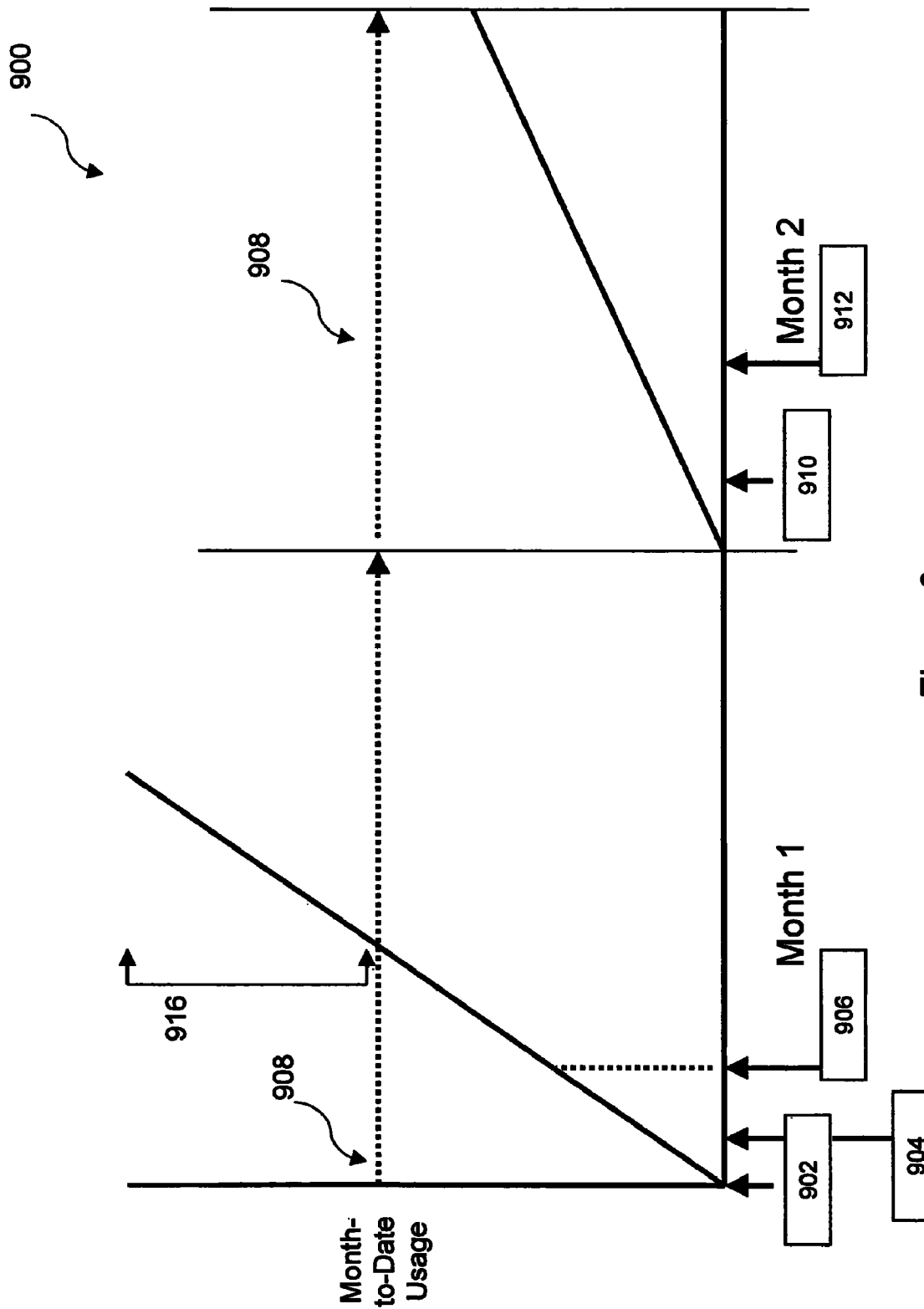
FIG. 9 is a graphical representation of a method for managing financial risk for wireless services, according to a second embodiment of the invention.

There are certain circumstances where financial risk needs to be addressed before a customer exceeds their monthly usage threshold. FIG. 9 is a graphical representation of a method for managing financial risk for wireless services, according to a second embodiment of the invention 900 that is initiated when the first month's usage threshold of service is paid 902 at activation by the customer, and shortly thereafter, an authorization 904 for the second month's usage threshold of service is made by the financial risk management system 113A/B. While the financial risk management system 113A/B is monitoring 212 customer usage of wireless services during a particular payment cycle, the system 113A/B will be alerted when a customer usage rate has exceeded the monthly usage rate threshold established at the time of initialization of wireless services. The monthly usage rate threshold is calculated by dividing the monthly usage threshold 908 by a specific sampling time. The sampling time is determined by the monitoring system 118. The sampling time for monitoring wireless usage can be daily, hourly, sub-hourly, or any fixed time at the choosing of the system administrator.

When the financial risk minimizing system 120 is notified that a customer usage rate has exceeded the monthly usage rate threshold, an authorization 906 against the customer's credit card is made. The amount of the authorization 906 is determined by the application 610 of rules for minimizing financial risk and based upon the results from that determination, an overage rate threshold 916 is approved. The overage rate threshold 916 is established by a temporary approval from the financial risk minimizing system 120 to increase a customer's usage rate until the end of a particular payment cycle. The financial risk management system 113A/B will continue to monitor 212 the customer's usage and make a determination (through application 610 of rules) for future increases in a customer usage rate as more overages occur. As in previous embodiments of the present invention, the customer's bill is sent 910 (including payment for overage and the next month's usage threshold) and a settlement 912 against the customer's credit card can be made without the threat of financial risk 712 that is present within the framework of typical postpaid processing systems.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems appears from the description. In addition, the present invention is not described with reference to any particular programming language. It will be appreciated that a variety of programming languages may be used to implement the teachings of the invention as described herein.

One skilled in the art will recognize that the particular examples described herein are merely illustrative of representative embodiments of the invention, and that other arrangements, methods, architectures, and configurations may be implemented without departing from the essential characteristics of the invention. Accordingly, the disclosure of the present invention is intended to be illustrative, but not limiting, of the scope of the invention, which is set forth in the following claims.

What is claimed is:

1. A system for wireless telephone communication, the system comprising:
    a retail brand system for providing mobile communications devices to at least one consumer for use with the system;
    a mobile virtual network enabler for establishing and maintaining wireless service, the mobile virtual network enabler coupled to the retail brand system;
    a wireless communication network for communication between communication devices, the wireless communication network coupled to the mobile virtual network enabler; and
    a financial risk management system for monitoring network usage and ensuring payment for wireless services, the financial risk management coupled to the mobile virtual network enabler;
    wherein the financial risk management system comprises:
    an initializing system for setting up an account for wireless services, the initializing system coupled to the mobile virtual network enabler;
    a monitoring system for determining usage levels for a mobile device, the monitoring system coupled to the mobile virtual network enabler and the initializing system;
    a database module for storing usage data, the database module coupled to the monitoring system;
    a financial risk minimizing module for limiting financial exposure from providing wireless services, the financial risk minimizing module coupled to the monitoring system and the mobile virtual network enabler; and
    a set of rules, the rules applied to data from the monitoring system to determine whether to terminate wireless services.

2. The system of claim 1, wherein the financial risk management system is formed as a portion of the mobile virtual network enabler.

3. The system of claim 1, wherein the financial risk management system is a third party system operated separately from the mobile virtual network enabler.

4. A system for limiting financial risk associated with subscribers of wireless services, the wireless services offered on a wireless system having a wireless network and a mobile virtual network enabler, the system for limiting financial risk comprising:
    a monitoring system for determining usage levels for a mobile device, the monitoring system coupled to the mobile virtual network enabler to receive usage data;
    a memory module for storing usage data for the mobile device, the memory module coupled to the monitoring system;
    a financial risk minimizing module for limiting the financial exposure for providing wireless services, the financial risk minimizing module coupled to the monitoring system and the mobile virtual network enabler; and
    an initializing system for setting up an account for wireless services, the initializing system coupled to the mobile virtual network enabler to activate service for the mobile device;
    wherein the initializing system is coupled to a credit authorizing unit, and wherein the initializing system authorizes and settles a charge for service before signaling the mobile virtual network enabler to activate wireless services.

5. The system of claim 4, wherein the financial risk management system further comprises a set of rules, the rules used by the financial risk management system to determine whether to terminate wireless services.

6. The system of claim 4, wherein the monitoring system monitors the usage data for the wireless network and filters out usage data for mobile devices that are prepaid or on a monthly subscription.

7. The system of claim 4, wherein the memory module further comprises a database for storing usage data, wherein the database stores usage information for a plurality of mobile devices.

8. The system of claim 4, wherein the financial risk minimizing module further comprises:
    a risk measurement module coupled to the memory to receive usage information, the risk measurement module generating a risk signal if the usage for a mobile device exceeds a predefined threshold; and
    a credit authorizing unit for authorizing a credit card charge in response to the risk signal, the credit authorizing unit coupled to the risk measurement module to receive the risk signal and coupled to a credit card company to send an authorization request.

9. A method for managing financial risk for a wireless network, the method comprising the steps of:
    monitoring usage of the wireless network by a mobile device to generate usage data;
    analyzing the usage data; and
    minimizing financial risks related to usage of the wireless network by the mobile device.

10. The method of claim 9, further comprising the step of initializing wireless service for the mobile device prior to the step of monitoring.

11. The method of claim 10, wherein step of initializing wireless service comprises the steps of:
    receiving mobile device identification information;
    receiving financial information from a customer associated with the mobile device;
    securing payment of a charge for services for a predetermined amount of time;
    establishing a usage threshold for wireless services; and
    activating a phone number on the network.

12. The method of claim 11, wherein the mobile device identification information includes a telephone number and an electronic serial number for the mobile device.

13. The method of claim 11, wherein the financial information includes a name and a credit card number.

14. The method of claim 11, wherein step of securing payment comprises the steps of:
authorizing a charge for wireless services to a credit card; and
settling the charge for wireless services with a credit card service.

15. The method of claim 9, wherein the step of monitoring usage of the wireless network comprises the steps of:
gathering data on usage of the wireless network; and
filtering the gathered data to produce the usage data.

16. The method of claim 15, wherein the step of monitoring further comprises the steps of:
storing the gathered data in a database; and
reporting the filtered data.

17. The method of claim 15 wherein the step of filtering excludes usage data for mobile devices that have prepaid and subscription type plans.

18. The method of claim 9, wherein the step of analyzing wireless usage by the mobile device further comprises the steps of:
receiving usage data;
comparing usage data to a threshold; and
determining usage data exceeds the threshold.

19. The method of claim 18, wherein for the step of comparing usage data to the threshold, the threshold is one from the group of a monthly usage threshold; an overage threshold; a monthly usage rate threshold; and an overage rate threshold.

20. The method of claim 18, wherein the step of minimizing financial risks related to usage of the wireless network further comprises the steps of: calculating an additional amount to bill a customer; and authorizing additional amount against customer's credit card.

21. The method of claim 20, further comprising the step of determining if the authorization is accepted and terminating wireless service for the mobile customer if the authorization is not accepted.

22. The method of claim 9, wherein the step of analyzing wireless usage by the mobile device further comprises the steps of:
receiving usage data;
applying a rule for minimizing financial risk to the usage data; and
determining whether the usage data violates a rule.

23. The method of claim 22, wherein the step of minimizing financial risks related to usage of the wireless network comprises the steps of:
calculating an additional amount to bill a customer;
authorizing additional amount against customer's credit card; and
determining if the authorization is accepted.

24. The method of claim 9, wherein the step of minimizing financial risks related to usage of the wireless network applies a rule for minimizing financial risk to the usage data.

25. The method of claim 24, wherein the rule for minimizing financial risk is one from the group of:
determining whether a customer meets one or more account requirements;
determining whether an amount of time a customer has existed exceeds a threshold;
determining whether a customer's payment history is acceptable; and
determining whether there are relationships between this customer and other accounts.

26. The method of claim 9, wherein the step of minimizing financial risks related to usage of the wireless network performs the following steps:
determining if an end of a payment cycle has been reached;
determining if a predetermined time has elapsed since the end of the payment cycle;
sending bill and authorizing a charge against the customer's credit card;
determining whether the credit authorization failed; and
terminating wireless service for the mobile customer if the authorization failed.

27. The method of claim 9, wherein the step of minimizing financial risks related to usage of the wireless network performs the following steps of:
determining an amount to charge for wireless services;
authorizing the charge against a credit card associate with the mobile device a first time;
determining if credit authorization fails a first time, and if the credit authorization fails the first time notifying a customer associated with the mobile device;
authorizing the charge against a credit card associate with the mobile device a second time;
determining if credit authorization fails a second time, and if the credit authorization fails the second time, terminating the wireless service for the mobile device.

28. The system of claim 1, wherein:
a) the financial risk management system comprises a first computer;
b) the retail brand system comprises a second computer; and
c) the wireless communication network comprises:
i) one or more wireless base stations;
ii) one or more mobile switching centers; and
iii) one or more messaging service centers.

29. The method of claim 27, wherein:
a) the wireless network comprises:
i) one or more wireless base stations;
ii) one or more mobile switching centers; and
iii) one or more messaging service centers;
b) the step of monitoring usage of the wireless network is performed using one or more devices comprising a first computer; and
c) the step of minimizing financial risks is performed using one or more devices comprising a second computer.

* * * * *